United States Patent [19]
Juri et al.

[11] Patent Number: 5,594,550
[45] Date of Patent: Jan. 14, 1997

[54] DIGITAL SIGNAL RECORDING APPARATUS FOR RECORDING DIGITAL DATA COMPRISING A PLURALITY OF RECORDING BLOCKS

[75] Inventors: Tatsuro Juri, Osaka; Akira Iketani, Higashiosaka; Chiyoko Matsumi, Suita, all of Japan

[73] Assignee: Matsushita Electric Industrial Co., Ltd., Osaka-Fu, Japan

[21] Appl. No.: 261,044

[22] Filed: Jun. 14, 1994

[30] Foreign Application Priority Data

Jun. 16, 1993 [JP] Japan ................................ 5-144658

[51] Int. Cl.⁶ ....................................................... H04N 9/79
[52] U.S. Cl. .......................... 386/40; 360/32; 360/48; 348/423; 348/420; 386/124
[58] Field of Search ................................... 358/335, 310, 358/341, 343; 360/32, 48, 33.1; 348/420, 423; H04N 5/76, 9/79

[56] References Cited

U.S. PATENT DOCUMENTS

| | | | |
|---|---|---|---|
| 4,882,732 | 11/1989 | Kaminaga | 360/53 |
| 5,023,710 | 6/1991 | Kondo et al. | 358/335 |
| 5,299,069 | 3/1994 | Kohsaka et al. | 358/335 |
| 5,341,250 | 8/1994 | Uchida et al. | 360/48 |
| 5,347,406 | 9/1994 | Chiba et al. | 360/32 |

FOREIGN PATENT DOCUMENTS

| | | |
|---|---|---|
| 0460764 | 12/1991 | European Pat. Off. |
| 4117059 | 12/1991 | Germany |

OTHER PUBLICATIONS

"Proposed SMPTE Standard", SMPTE Journal, issued Jun. 1993.

*Primary Examiner*—Tommy P. Chin
*Assistant Examiner*—Khoi Truong
*Attorney, Agent, or Firm*—Greenblum & Bernstein P.L.C.

[57] ABSTRACT

A recording apparatus for recording digital data comprised of a plurality of recording blocks on a recording medium includes a grouping circuit which makes a group of the digital data according to a predetermined time-based interval, A sequence number generator divides the group into "N" sequences. "N" is an integer. A data block generator divides the input data in each sequence into a plurality of data blocks. A sequence number generator generates a sequence number for each data blocks associated with each recording blocks, An ID block generator generates an ID information of each data block based on the sequence number. A recording block generator generates the recording block based on the ID information and the data block.

16 Claims, 5 Drawing Sheets

DIGITAL SIGNAL RECORDING APPARATUS FOR RECORDING DIGITAL DATA COMPRISING A PLURALITY OF RECORDING BLOCKS

BACKGROUND OF THE INVENTION

1. Field of the Invention

The present invention relates to a digital signal recording apparatus and, more particularity, to a digital signal recording apparatus for recording digital audio and video signals.

2. Description of the Prior Art

Consumer-use digital video Cassette Recorders (VCR) for recording audio and video signals as digital signals are now commercially available. The consumer-use digital Video Cassette Recorder (VCR) market, however, has been constrained by the various methods applying video compression (band width compression) technologies to the video signal that have been proposed as a means for reducing cassette size.

Figure 5A:
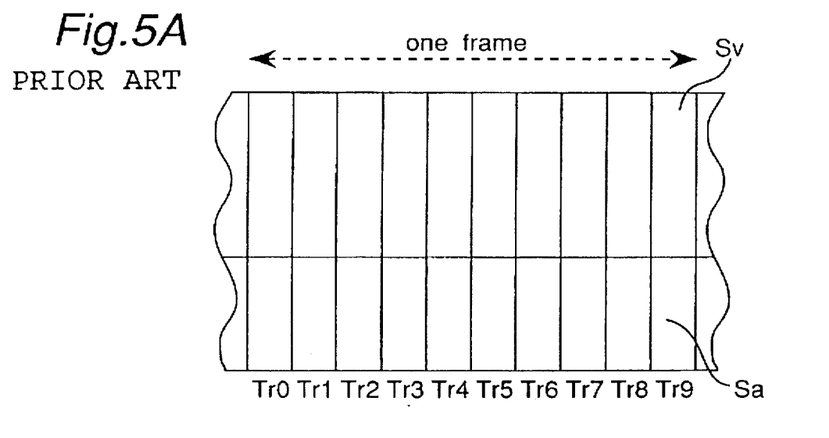
FIG. 5A is an illustration of assistance in explaining the positioning of data recorded on tape by a digital VCR.

In FIG. 5A, an example of the on-tape positioning of the video signals and audio signals recorded by a digital VCR is shown. The audio and video signals for one frame are recorded to ten tracks Tr0 to Tr9 on tape. It is to be noted that the audio and video signals are recorded to specific and different segments Sa and Sv of each track.

Figure 5B:
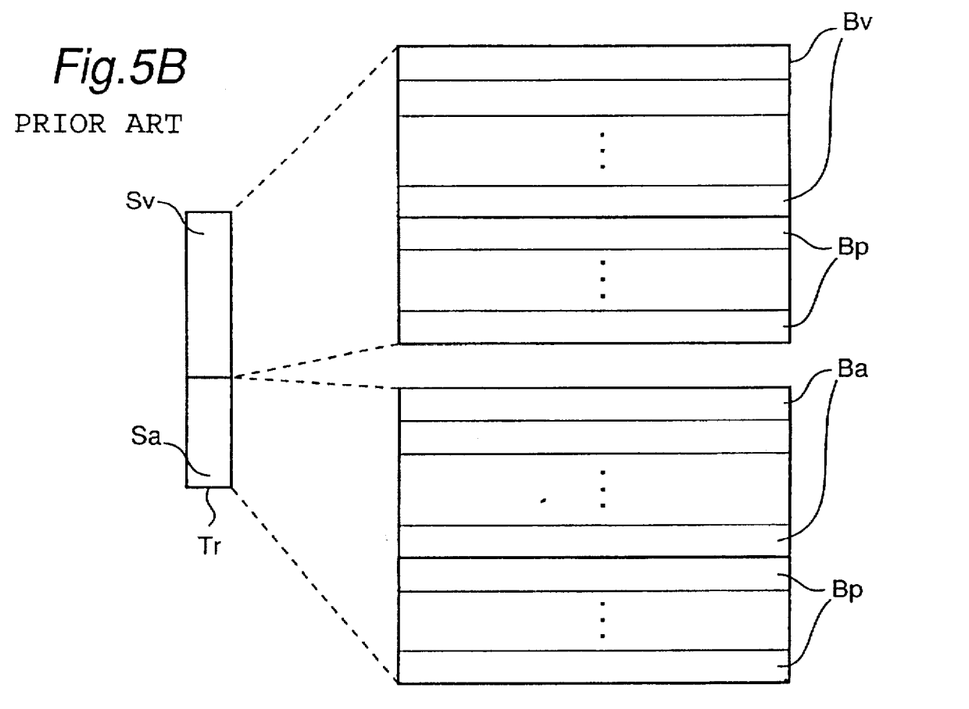
FIG. 5B is an illustration of assistance in explaining the positioning of recording blocks in a recording track.

As shown in FIG. 5B, each track Tr further comprises a plurality of recording blocks Br (FIG. 6) in the audio and video signal segments Sa and Sv. Each audio signal segment Sa is comprised of a predetermined number of audio data recording blocks Ba and parity recording blocks Bp. Similarly, each video segment Sa is comprised of a predetermined number of video data recording blocks Bv and parity recording blocks Bp.

Figure 6:
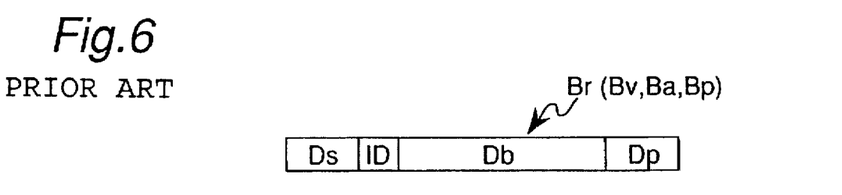
FIG. 6 is an illustration of assistance in explaining the recording block unit structure.

The audio data recording block Ba, the video data recording block by, and the parity recording block Bp has principally the same construction of the recording block Br, as best shown in FIG. 6. The audio or video signals are divided into a plurality of small data blocks Db which is recorded in one recording block Br. Each data block Db is complemented by a synchronization signal Ds for bit synchronization, ID information indicating the location of the recording data block in the frame, and parity data Dp for error correction. In parity recording blocks Bp, only parity data is recorded in its data Db instead of video or audio signal data.

When the data blocks Db in the recording blocks Br are subsequently reproduced, those complementing information makes it possible to reproduce the original video signal and/or audio signal from the recorded data block Db in the recording blocks Br.

Because distortion caused by video compression processing increases when video compression and expansion are repeated, it is preferable when copying between VCR units to copy the data in the video compressed state. This means that it is preferable to copy the data as in the form of recorded data block Db in the recording block Br units.

It is not guaranteed, however, that all recorded data in recording blocks in each frame can be reproduced because of variable speed reproduction, transmission errors, and other factors relating to VCR operation. When the recorded data blocks in any recording block units for one frame cannot be reproduced, the recording block unit(s) from other frame(s) are substituted for the recording block units whose recorded data block could not be reproduced, so that the unreproducible recorded data block(s) are reproduced by simulation.

When substitution by recording block unit is used in this way, however, recording block units from plural frames will be mixed into one frame (in the ten tracks shown in FIG. 5) on the copy tape. The audio signal, however, cannot be reproduced if the time-base relationship of the sequential recording block units is not maintained. Only the information for adjacent frames can be obtained with the ID information associated with each recording block units in this conventional digital VCR, however, and it is not possible to differentiate plural frames. In addition, frame information is lost during reproduction because of the substitution of ID information during recording when copying. It is therefore difficult to determine the time-base relationship of each recording block.

As a result, it is difficult to reproduce the audio signal when variable speed reproduction of recorded data blocks or error correction is applied to the recording block units in the conventional digital VCR.

SUMMARY OF THE INVENTION

The present invention has been developed with a view to substantially solving the above described disadvantages and has for its essential object to provide an improved digital signal recording apparatus for recording digital data comprised of a plurality of recording blocks on a recording medium. The apparatus comprises a grouping means for making a group of said digital data according to a predetermined time-based interval, a data block generating means for dividing said digital data into a plurality of data blocks, a sequence number generating means for dividing said group into "N" sequences, said "N" being an integer, to generate a sequence number for each of said data blocks associated with each of said recording blocks, an ID block generating means for generating an ID information for each of said data block based on said sequence number, and a recording block generating means for generating said recording block based on said ID information and said data block.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which.

DETAILED DESCRIPTION OF THE PREFERRED EMBODIMENT

Figure 1:
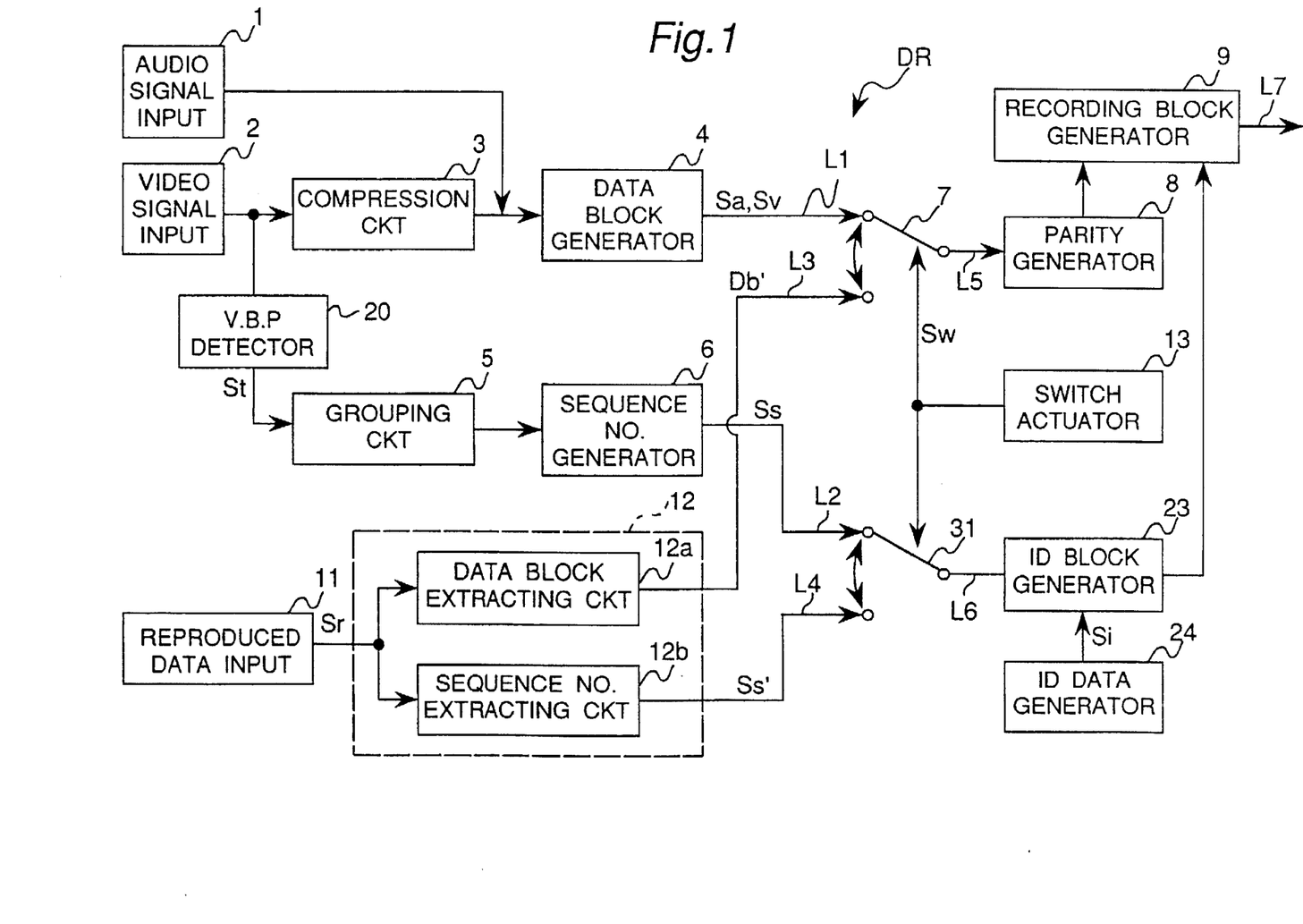
FIG. 1 is a block diagram showing a digital signal recording apparatus according to the present invention.

Referring to FIG. 1, a digital signal recording apparatus according to an embodiment of the present invention is shown. The digital signal recording apparatus DR comprises an audio signal input 1 from which digital audio signal is input and a video signal input 2 from which the digital video signal is input. A compression circuit 3 is connected to the video data input 2 for compressing the video signal to produce a compressed video data Sv.

A data block generator 4 is connected to the compression circuit 3 and the audio data input 1. The data block generator 4 divides the compressed video data Sv into predetermined data blocks Db and produces an unit video data Sv, as previously described with reference to FIG. 6. Similarly, the audio signal is divided into data blocks Db, and the unit audio signal Sa is produced. The unit data Sv and Sa are output through a line L1.

A data switch 7 is provided for connecting the line L1 to a line L5 in response to a selection signal Sw from a switch actuator 13. The switch actuator 13 can be operated manually or automatically based on the operation mode, for example a normal recording or a data copying (dubbing the reproduced data), of the recording apparatus DR.

An parity generator 8 is connected to the line L5 for producing the error correction parity data Dp (FIG. 6) based on each of unit video data Sv transferred therein, and thus adds produced parity data Dp to the unit video data Sv. It is noted that the unit video data Sv is the data block Db, as described before. Similarly, the error correction circuit 8 produces and adds the parity data Dp to the unit audio data Sa (Db). Thus, the data block Db is complement by parity data Dp for the recording block Br.

A recording block generator 9 is connected to the parity generator 8 for receiving video and audio data Sv and Sa comprising the parity data Dp and data block Db.

A grouping circuit 5 is also connected to the video signal input 2 through a V.B.P detector 20 which detects the vertical blanking period from the video signal and produces a timing signal St. The grouping circuit 5 counts the number of frames in the video signal based on the timing signal St, and forms groups from each continuous block of twelve frame periods.

A sequence number generator 6 is connected to the grouping circuit 5 for dividing each group period into one sequence per frame. Each group is divided into twelve sequences. The sequence number generator 6 generates a sequence data Ss indicative of a sequence number for each sequence in order from the first sequence in one group, and outputs the sequence data Ss through a line L2.

An ID switch 31 is provided for connecting the line L2 to a line L6 and is also actuated by the switch actuator, so that the sequence data Ss is transmitted to an ID block generator 23 which is connected to the line 6. An ID generator 24 is also connected to the ID block generator 23. The ID generator 24 determines the ID information indicating the number of track Tr and recording block Br wherein each data block Db is recorded, and produces an ID information data Si.

Based on the sequence data Ss and the ID information data Si, the ID block generator 23 produces the complete ID for each data block Db. It is to be noted that the ID produced here additionally includes the sequence data Ss of each data block Db. Thus, completed ID is transferred to the recording block generator 9.

The recording block generator 9 adds the ID from the ID block generator 23 to the parity data added data block Db, and further adds synchronization signal Ds. Thus, the complete video or audio signal for one recording block Br is produced, and is transferred through a line L7 for recording on the recording tape.

Hereinafter, the case when the digital data thus recorded by this recording apparatus DR is reproduced and then re-recorded is described. For reproduction of digital signal recorded according to the present invention, the recording apparatus DR further comprises a reproduced data input 11 from which reproduced digital signal Sr is input. Reproduced digital signal Sr comprises the data block Db, synchronization signal Ds, and the complete ID including the sequence Data, and parity data Dp which is completed by the recording block generator 9.

A recording block reproducing unit 12 is comprised of a data block extracting circuit 12a and a sequence number extracting circuit 12b, and is connected to a reproduced data input 11. From the reproduced signal Sr, the data block extracting circuit 12a extracts the reproduced data block Db', which is output thorough a line L3. Similarly, the sequence number extracting circuit 12b extracts a reproduced sequence data Ss' indicative of the sequence number of the reproduced data block Db' which is output through a line L4.

In this case, the switch actuator 13 actuates the switch 7 to connect the line L3 and the line L5, and actuates the switch 31 to connect the line L4 and the line L6. Thus, the reproduced data block Db' and sequence data Ss' are processed by the parity generator 8, recording block generator 9, and ID block generator 23 in cooperation of the ID data generator 24 for recording on tape, as described above.

According to the present invention, a sequence number identifying to which frame (sequence) the data block Db of the recording block Br belongs is added to each data block Db before recording when the video signal and audio signal are directly recorded. As a result, it can be determined to which frame each recording block belongs when the recording blocks are reproduced.

This is particularly effective when recording blocks Br belonging to plural sequences are reproduced at one time from the data obtained in one track scan during variable speed reproduction because the original recording block sequence can be reproduced by re-ordering the recording blocks based on the sequence number of each recording block.

When copying variable speed reproduced data by this embodiment, the data of the reproduced recording blocks and the sequence numbers can be re-recorded directly. In this case, recording blocks of plural sequence numbers will be mixed together in one sequence period on tape. However, because the sequence numbers are added to each recording block individually, the original recording block order can be reproduced as described above. Therefore, even data for which the time-based relationship is important, e.g., audio signal data, can be easily reproduced.

In this embodiment described above, one sequence period is one frame, and one group is twelve sequences, but it is also possible to otherwise set the size of one sequence period and one group period according to the input signal.

It is to be noted that a sequence number is added to all recording blocks in this embodiment above. However, when there are recording blocks comprising only the parity data of the external code generated by error correction coding (Bp), this recording block may be related to the data of plural recording blocks.

When a recording block related to this error correction code is associated with plural sequences, it is difficult to determine the sequence number to be assigned to this parity data recording block. In addition, this error correction code parity data is changed when the data is copied, and it is therefore not necessary to transmit the reproduced parity data. As a result, other information is substituted for this sequence number in recording blocks having a non-specific sequence number.

Figure 2:
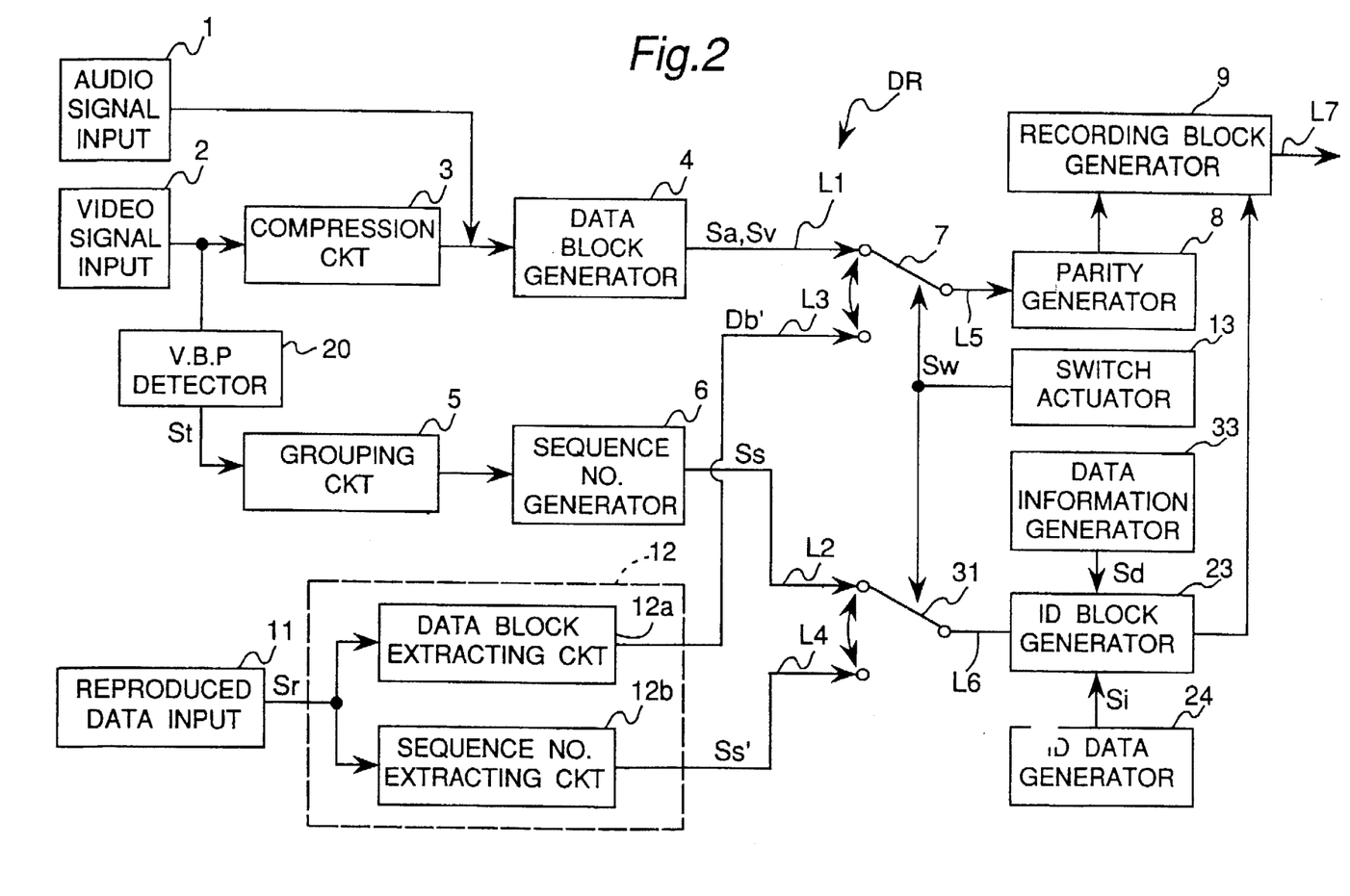
FIG. 2 is a-block diagram showing a modification of the digital signal recording apparatus of FIG. 1.

Referring to FIG. 2, a modification of the digital signal recording apparatus of FIG. 1 is shown. In this apparatus, a data information generator 33 is additionally provided and is connected to the ID block generator 23. This is because when the parity recording blocks Bp shown in FIG. 5B is reproduced, the data extracting circuit 12a does not extract the reproduced data Db' but the sequence extracting circuit 12b extracts the reproduced sequence number Ss'. In this case, a data type identification number, which indicates what type of data is recorded to the data area (the related recording block) to which the error correction code is related, is recorded to the recording area to which the sequence number of the recording block is recorded. The data information generator 33 produces a data signal Sd indicating these data types which is input to the ID block generator 23. The data information generator 33 can be operated manually or automatically.

It is to be noted that the data information generator 33 also produces a data signal Sd when the signals from audio and video signal inputs 1 and 2 are recorded in a manner as described the above. For example, any of the signal inputs 1 or 2 actuates the data information generator 33 to produce the data signal Sd indicative of the kind of signals input thereto. It is also possible that the user may actuates the data information generator 33 according to the kind of singles for recording.

When recording a recording block for which it is not necessary to add a sequence number, it is therefore possible to record information showing the type of data stored in the group of recording blocks associated with said recording block.

Figure 3:
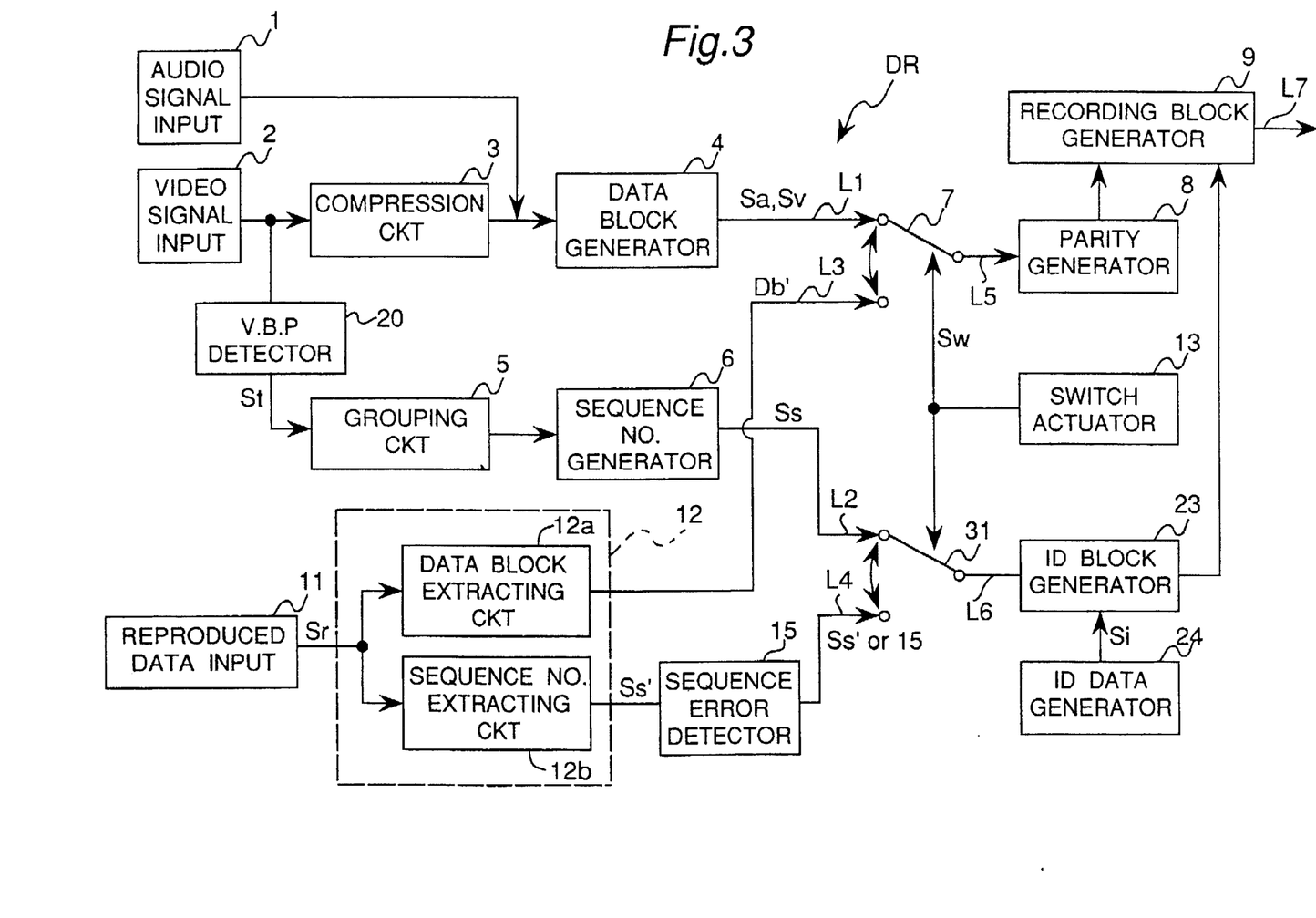
FIG. 3 is a block diagram showing another modification of the digital signal recording apparatus of FIG. 1.

Referring to FIG. 3, another modification of the recording apparatus DR of FIG. 1 is shown. In this apparatus, a sequence error detector 15 is additionally provided on the line L4 after the sequence number extracting circuit 12b. The sequence error detector 15 determines whether the sequence number (Ss') of the recording blocks (Sr') input thereto from the sequence number extracting circuit 12b are correct.

When the sequence numbers are correct, sequence number Ss' which is simultaneously reproduced with the data block are input to the ID block generator 23 through the line L4, the sequence switch 31, and the line L6. The data block Db' corresponding to this sequence number is also input to the parity generator 8 though the line L3 and switch 7.

However, when there is a strong possibility that the reproduced sequence number is wrong, a special number not assigned as a sequence number is produced by the sequence error detector 15. This special number is output to the switch 31 as the sequence number of that recording block.

For example, if the numbers 0–11 are assigned as sequence numbers for the twelve sequences in one group, the sequence number assigned to recording blocks of which the sequence affiliation is not known is, for example, 15. As a result, it is possible to express in 4 bits twelve different sequence numbers and information that the sequence of the recording block is unknown.

Using this modified embodiment of the invention, recording blocks for which the sequence is unknown can be determined from the sequence number, and operating errors caused by sequence number errors can be prevented. Special sequence numbers such as this can also be used as the sequence number of recording blocks not associated with any single specific recording block.

When next copying this recorded data, there are cases in which it is possible to reproduce the data of the recording block but not the sequence number. In such cases it is obviously difficult to generate a sequence number for the recording block during recording.

Figure 4:
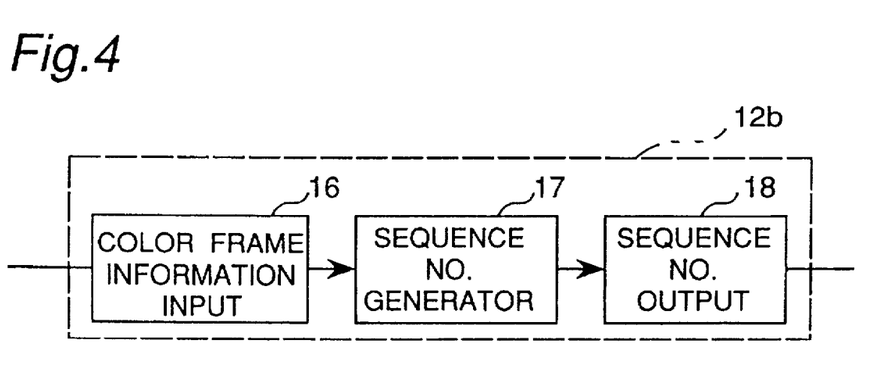
FIG. 4 is a block diagram showing a sequence number generator according to the present invention.

Referring to FIG. 4, a block diagram showing the details of an example of sequence number extracting circuit 12b according to the present invention is shown. The sequence number extracting circuit 12b comprises a color frame information input 16, a sequence number generator 17, and a sequence number output 18.

The phases of the color difference signals multiplexed to each frame of a composite TV signal differ. For example, the phase (color frame) changes in a two frame cycle in the NTSC signal format, and changes in a four frame cycle in the PAL signal format. It is therefore necessary simultaneously transmit the color frame if a composite TV signal is handled in frame units.

The sequence number generator 17 shown in FIG. 4 generates a sequence number of which the low bit is the same as the color frame number input from the color frame information input 16, and outputs the result to the sequence number output 18. In other words, the low one bit of the sequence numbers in an NTSC signal are the same value as the color frame, and the low two bits of the sequence numbers in a PAL signal are the same value as the color frame.

By thus setting the sequence number so that the color frame can be detected from the sequence number, it is not necessary to record the color frame information. The color frame information is also important information for recording a composite TV signal separated into luminance signal and color difference signal components, and can also be used with a non-composite TV signal data processed on a plural frame cycle with the processing method differing on a frame basis.

The present invention has been described above, but the method and construction of recording block grouping, error correction coding, and sequence number assignment can be varied in many ways from those described above. The above embodiment can also be combined in various ways, and can be achieved in software. The invention is also applicable to formats other than that of the prior art described above, and is furthermore applicable to recording data other than video signal and-audio signal data.

By means of a relatively simple configuration, the present invention can reproduce data copied from variable speed reproduced data, and the practical utility of the invention is therefore great.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

It is to be noted that the present invention can be applicable to any other digital recording medium then the digital VCR. Also any other recording medium than the tape such as an optical disk or a magnetic disk suitable for digital recording can be used in the recording apparatus according to the present invention.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A digital signal recording apparatus for recording digital data comprised of a plurality of recording blocks on a recording medium, said apparatus comprising:

grouping means for making a group of said digital data according to a predetermined time-based interval;

data block generating means for dividing said digital data into a plurality of data blocks;

sequence number generating means for dividing said group into "N" sequences, "N" being an integer, and for generating a sequence number for each of said data blocks associated with each of said recording blocks;

ID block generating means for generating an ID information for each of said data blocks based on said sequence number; and recording block generating means for generating said recording block based on said ID information and said data block.

2. A digital signal recording apparatus as claimed in claim 1, wherein each of said sequences is one frame of a television signal.

3. A digital signal recording apparatus as claimed in claim 2, wherein each of said sequences is determined as to be synchronized to the color frame cycle of a composite television signal.

4. A digital signal recording apparatus as claimed in claim 1, further comprising a parity generating means for generating parity data for error correction based on said recording block and adding said parity data to said data block.

5. A digital signal recording apparatus as claimed in claim 1, further comprising a data information generating means for generating a data signal indicative of type of said digital data so that said ID block generating means and generates said ID information based on said sequence number and said data signal.

6. A digital signal recording apparatus for recording digital data comprised of a plurality of recording blocks, each of said recording blocks having an ID block including "N" divided sequence number thereof and data block, said apparatus comprising:

a data block extracting means for extracting said data block from said digital data;

a sequence number extracting means for extracting said sequence number from said digital data;

an ID block generating means for producing an ID information for said extracted data block based on said extracted sequence number; and a recording block generating means for generating a recording block based on said ID information and said extracted data block.

7. A digital signal recording apparatus as claimed in claim 6, further comprising a parity generating means for generating parity data for error correction based on said recording block and adding said parity data to said data block.

8. A recording apparatus as claimed in claim 6 further comprising a data information generating means for generating a data signal indicative of type of said digital data when said data block extracting means extracts nothing of said data block so that said ID block generating means generates said ID information based on said extracted sequence number and said data signal.

9. A recording apparatus as claimed in claim 6 further comprising a sequence error detecting means for determining whether said extracted sequence number is correct or not, and newly producing a sequence number other than "N" so that said ID block generating means generates an ID information for said extracted data block based on said newly produced sequence number.

10. A recording apparatus as claimed in claim 9, wherein said "N" is an integer being zero to eleven.

11. A recording apparatus as claimed in claim 9, wherein said newly produced sequence number is 15.

12. A digital signal recording apparatus for recording digital data comprised of a plurality of recording blocks on a recording medium, said apparatus comprising:

a grouping circuit that forms a group of said digital data according to a predetermined time-based interval;

a data block generator that divides said digital data into a plurality of data blocks;

a sequence number generator that divides said group into "N" sequences, "N" being an integer, to generate a sequence number for each of said data blocks associated with each of said recording blocks;

an ID block generator that generates ID information for each of said data blocks based on said sequence number; and a recording block generator that generates said recording block based on said ID information and said data block.

13. A digital signal recording apparatus according to claim 12, wherein each of said sequences is one frame of a television signal.

14. A digital signal recording apparatus according to claim 13, wherein each of said sequences is determined as to be synchronized to the color frame cycle of a composite television signal.

15. A digital signal recording apparatus according to claim 12, further comprising a parity generator that generates parity data for error correction based on said recording block to add said parity data to said data block.

16. A digital signal recording apparatus according to claim 12, further comprising a data information generator that generates a data signal indicative of type of said digital data so that said ID block generator generates said ID information based on said sequence number and said data signal.

* * * * *

UNITED STATES PATENT AND TRADEMARK OFFICE
CERTIFICATE OF CORRECTION

PATENT NO. : 5,594,550
DATED : January 14, 1997
INVENTOR(S) : T. JURI et al.

It is certified that error appears in the above-indentified patent and that said Letters Patent is hereby corrected as shown below:

On the title page, item: [57], "ABSTRACT", lines 4-5, change "interval, A" to ---interval. A---.

On the cover, in section [57], "ABSTRACT", line 10, change "blocks, An" to ---blocks. An---.

At column 7, line 40 (claim 5, line 4), delete "and".

Signed and Sealed this

Twenty-second Day of April, 1997

Attest:

BRUCE LEHMAN

*Commissioner of Patents and Trademarks*

*Attesting Officer*